United States Patent [19]

Sullivan

[11] Patent Number: 5,438,680
[45] Date of Patent: Aug. 1, 1995

[54] METHOD AND APPARATUS FOR ENHANCING CONCURRENCY IN A PARALLEL DIGITAL COMPUTER

[75] Inventor: Herbert W. Sullivan, La Jolla, Calif.

[73] Assignee: Intellectual Properties and Technology, Inc., San Diego, Calif.

[21] Appl. No.: 56,610

[22] Filed: May 3, 1993

Related U.S. Application Data

[63] Continuation of Ser. No. 188,299, Apr. 29, 1988, abandoned.

[51] Int. Cl.6 .................. G06F 12/00; G06F 15/16
[52] U.S. Cl. .................. 395/800; 364/228.1; 364/231.9; 364/256.8; 364/260; 364/265.3; 364/281.3; 364/DIG. 1
[58] Field of Search ................. 395/425, 800

[56] References Cited

U.S. PATENT DOCUMENTS

| | | | |
|---|---|---|---|
| 4,356,546 | 10/1982 | Whiteside et al. | 364/200 |
| 4,426,681 | 1/1984 | Bacot et al. | 364/200 |
| 4,484,262 | 11/1984 | Sullivan et al. | 364/200 |
| 4,503,499 | 3/1985 | Mason et al. | 364/200 |
| 4,574,350 | 3/1986 | Starr | 395/400 |
| 4,635,189 | 1/1987 | Kendall | 364/200 |
| 4,636,942 | 1/1987 | Chen et al. | 364/200 |
| 4,658,351 | 4/1987 | Teng | 364/200 |
| 4,707,781 | 11/1987 | Sullivan et al. | 364/200 |
| 4,779,194 | 10/1988 | Jennings et al. | 395/650 |
| 4,814,982 | 3/1989 | Weir | 364/200 |
| 4,922,413 | 5/1980 | Stoughton et al. | 395/800 |

*Primary Examiner*—Parshotam S. Lall
*Assistant Examiner*—Ayni Mohamed
*Attorney, Agent, or Firm*—Davis Hoxie Faithfull & Hapgood

[57] ABSTRACT

Parallel digital computers which include randomization of tasks among processors, assignment of tasks via indications stored in main memory units accessible by all processors, randomization of data locations among the memory units, the use of a conflict free network for communicating between processors and memory units, and various combinations thereof.

34 Claims, 8 Drawing Sheets

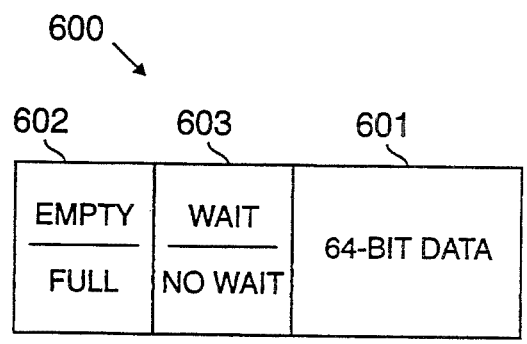
FIG. 6
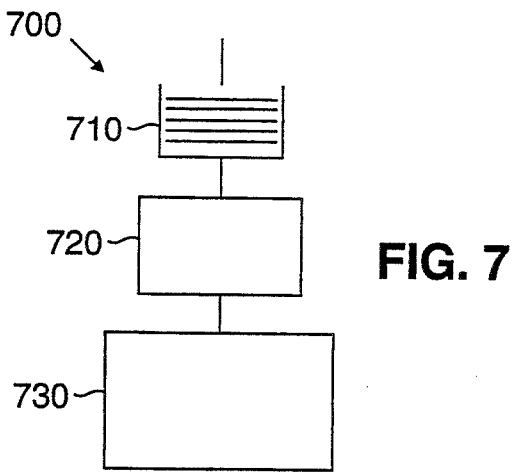
FIG. 7
FIG. 8

PUT BEFORE GET

GET BEFORE PUT

SEND BEFORE RECEIVE

RECEIVE BEFORE SEND

METHOD AND APPARATUS FOR ENHANCING CONCURRENCY IN A PARALLEL DIGITAL COMPUTER

This is a continuation of application Ser. No. 07/188,299, filed on Apr. 29, 1988, now abandoned.

BACKGROUND OF THE INVENTION

A number of techniques have been conceived, some of which have been used, for speeding computations by computers. To date, the principal approaches to speeding up computers used have been to simply enhance the processing speed capability of traditional von Neumann architecture computers, the provision of a few coordinated computers operating in parallel, and vector processors. Speed up techniques include locality of reference, provided by such means as cache memory, local storage and specialized networks. These all provide relatively small speed ups. Improved instruction sets can also provide a degree of speed up.

Considerably greater speed ups may be achieved by exploiting concurrency through the use of parallel structures such as multiple functional units in each processor, pipelines, vector processors, and multiprocessors. For example, Bolt, Beranek and Newman, Inc.'s Butterfly, which uses thousands of processors, and the Thinking Machine Company's Connection Machine, a single instruction multiple datastream (SIMD) array machine with as many as 64,000 processors, may achieve very substantial speed ups for some types of problems suitable to their architecture.

In my earlier patents, Sullivan et al. U.S. Pat. Nos. 4,484,262 and 4,707,781, the disclosure of which is incorporated herein by reference, we have shown how the randomization or pseudo randomization (hashing) of data among numerous memory units and conflict-reduction means in accessing memory units can speed up parallel digital computers.

SUMMARY OF THE INVENTION

My present invention constitutes a method and apparatus for enhancing concurrency in a parallel digital computer. In particular, my present invention uses various method and apparatus combinations which may include random assignment of tasks to processors, reduced-conflict communications between processors and memory units, and storage in memory of information concerning tasks awaiting data items.

DESCRIPTION OF THE DRAWINGS

FIG. 6 is a representation of a memory location in accordance with one embodiment of my invention.

FIG. 7 is a schematic block diagram of a memory unit in accordance with one embodiment of my invention.

FIG. 8 is a schematic block diagram of a processor in accordance with one embodiment of my invention.

DETAILED DISCLOSURE

The Idealized, Optimum Machine

In order to explain the various aspects of my present invention, I will first describe the principal characteristics of an idealized "optimum machine" and will then describe the method and apparatus which I have conceived for approaching the performance of this optimum machine.

Concurrency is inherent in computation. It has nothing to do with the hardware. Not all computations exhibit concurrency. Consider, for example, the program:

Begin
B=0
End

On the other hand, typical computations involve a great deal of concurrency. Consider

X=A+B
Y=C+D
Z=E

Once A, B, C, D and E are evaluated (i.e., their values are known), the three indicated operations can be performed in parallel if assigned to parallel processors.

Figure 1:
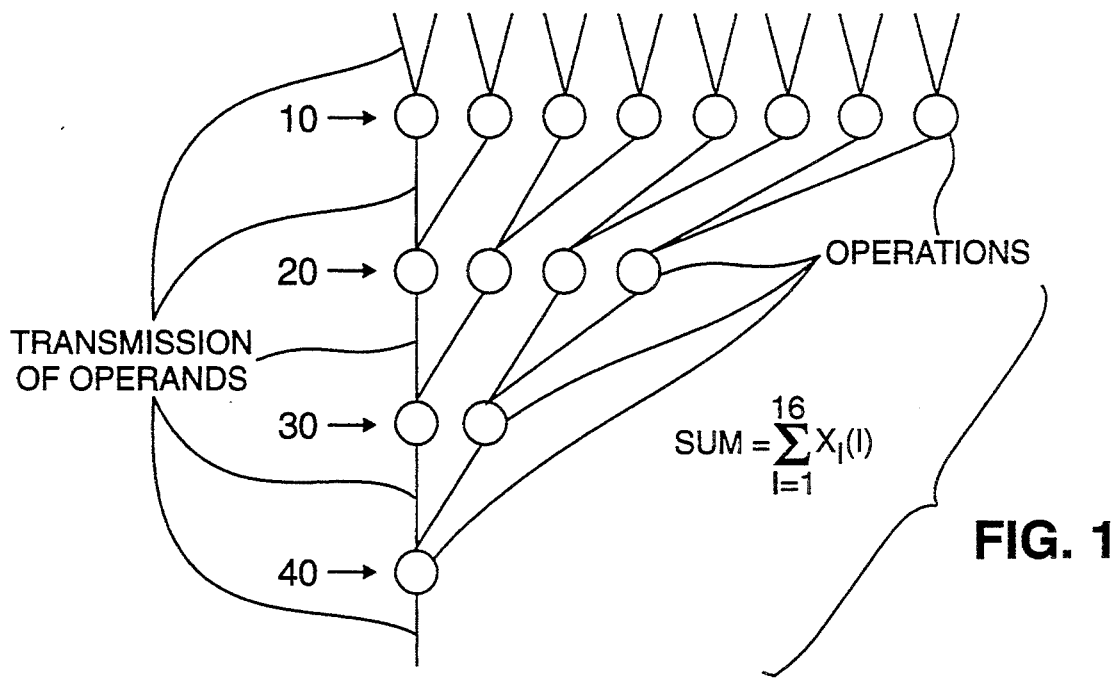
FIG. 1 is a dependency diagram or execution graph showing the dependency of various operations in a parallel computer.

FIG. 1 is a so-called dependency diagram or execution graph which shows the dependency between various operations in the manner discussed in papers of D. J. Kuck. This example shows that 16 numbers can be summed in 4 steps. The nodes (circles) in the execution graph of FIG. 1 represent operations, in this case simple additions. The connecting lines represent transmissions of operands. The so-called log sum algorithm is represented by this execution graph. Vectorizable executions have a simple parallel structure. In the case of FIG. 1, n things are added by pairs. This execution graph is just one level deep.

We now wish to relate the execution graph, a static structure which represents an algorithm, to actual operations performed by a parallel computer. We define an "atomic task" as an operation together with its operands, i.e., as a node together with its incident arcs. We say that an atomic task is runnable if all of its operands have been evaluated, but it has not yet been executed.

We now discuss an optimum machine for the execution of parallel computations. The optimum machine I envision would first identify the runnable tasks. Second, it would instantly assign processors (of which it is assumed to have as many as needed) to those atomic tasks. Third, it would transmit the operand values to the processors. Finally, it would store the results of the operation for future use. In the execution graph example of FIG. 1, the tasks of the top row 10 first would be identifiable as runnable, assigned to processors, run, and the resulting operands sent to the second row 20. This would be repeated for each of the four rows 10, 20, 30, 40 to provide the sum in four steps.

Note what I refer to as the division of labor. The algorithm specifies all of the operations and their operands, i.e., the atomic tasks. It specifies the (partial) order in which these atomic tasks are to be performed. As a result, it implies the execution graph of FIG. 1. The size "S" of the execution graph is the total number of atomic tasks, 15 in the case of FIG. 1. The depth "D" is the length in atomic tasks of the longest path, 4 in this case. The concurrency, which is the average number of atomic tasks that can be performed during the execution, is defined as S/D. The optimum machine, on the other hand, simply identifies runnable tasks, assigns tasks to processors, sends operands and stores results.

Figure 2:
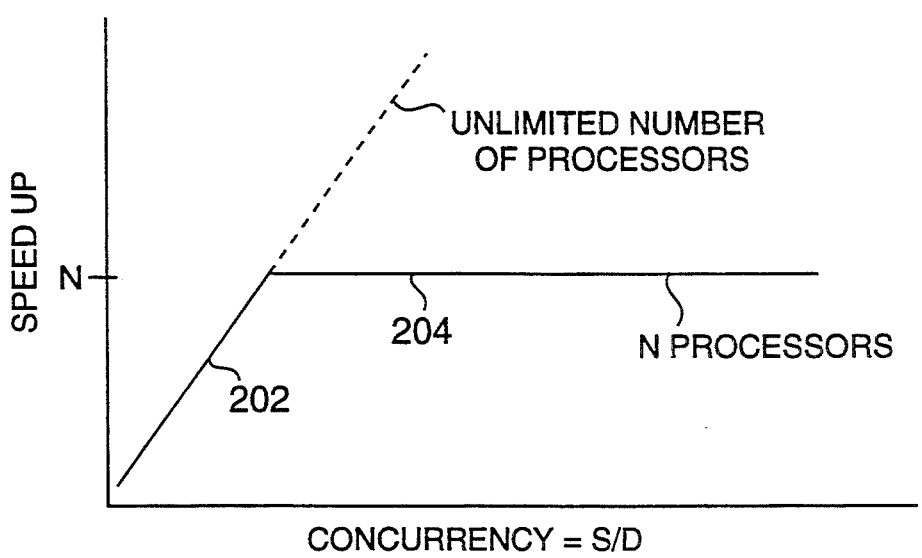
FIG. 2 is a graph of speed up achieveable in an idealized, optimum machine depending on the degree of concurrency.

The speed up provided by the optimum machine in any given case is generally understood and defined as the time taken by the optimum machine to process all of the atomic tasks with one processor, divided by the time taken with N processors. We assume in this discussion that the time for one processor of the optimum machine to complete one atomic task is one unit of time. Clearly, if the optimum machine has only one processor available, it will execute the execution graph in S units, the size of the execution graph. In FIG. 1, S=15. On the other hand, assuming sufficient processors are available, the execution time for a graph is D, the depth of the graph. This is because, with sufficient processors, each row will be processed in one unit of time. If, however, the optimum machine has only N available processors which is less that the number required for a row, the execution time will be limited by N. Plotting speed up versus concurrency as shown in FIG. 2, the optimum speed up increases linearly with the concurrency 202 until N is reached, and then it flattens out 204.

Figure 3:
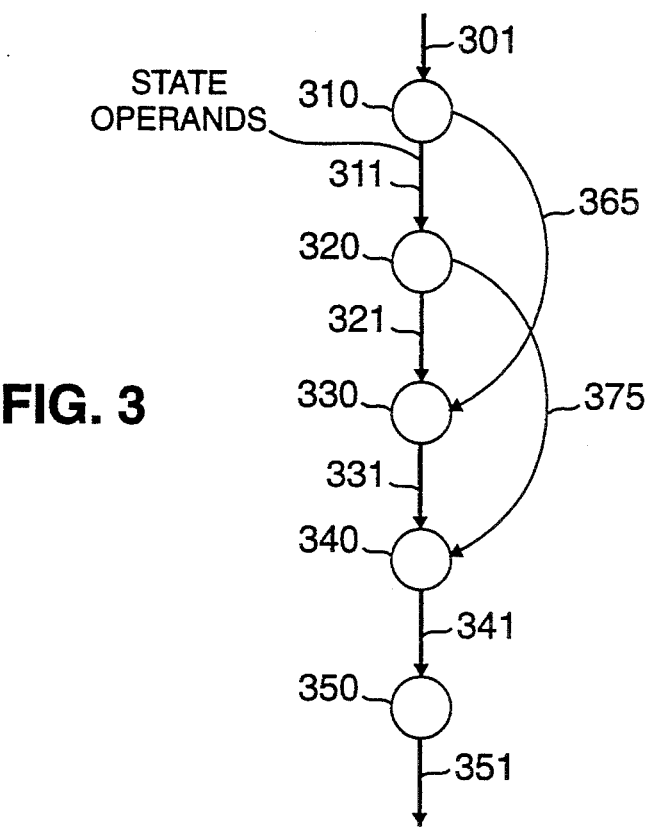
FIG. 3 is an execution graph depicting execution of sequential operations by a stored program computer.
Figure 4:
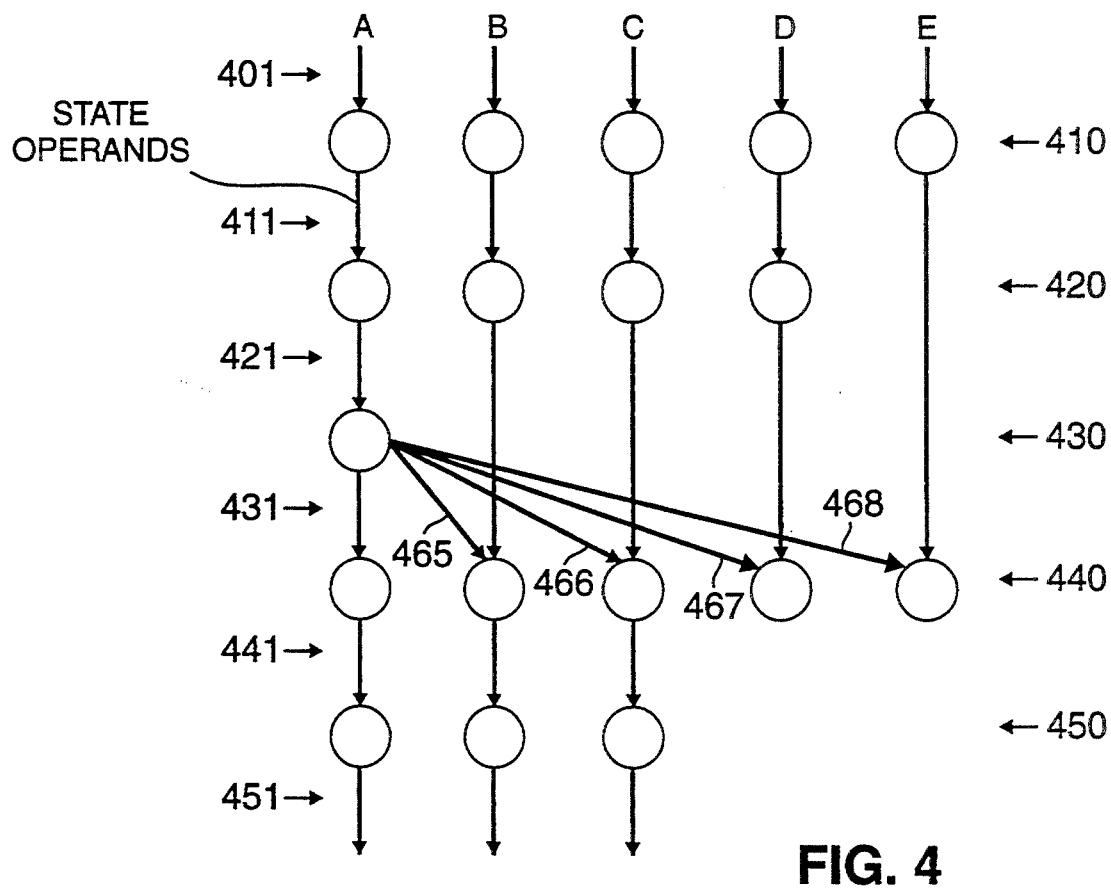
FIG. 4 is an execution graph depicting execution of a concurrent operation by a stored program computer.

In FIG. 3, we have adopted an execution graph to depict execution performed by a stored program computer. FIG. 3 is a sequential execution graph in which every atomic tasks depends on the previous one. In this execution graph and that of FIG. 4, the circles 310, 320, 330, 340, 350 are nodes representing operations, the heavy lines with arrow heads 301, 311, 321, 331, 341, 351 are state operands, and the light lines 365, 375 represent transmissions of operands. Because we are discussing the operation of a stored program machine, we presume that there is a program counter and some registers. The contents of these, plus the condition code, are sent from one atomic task to another. Each atomic task picks up this state information, does something with it, and outputs new state information and possibly a new operand. The only new aspect of this type of execution graph is the addition of state operands. Similarly in FIG. 4, a concurrent execution diagram, the activities of a multiprocessor, comprising a plurality of general purpose processors, is represented. The big difference between stored program execution diagrams of the type discussed earlier is that, because branches are possible in a stored program machine, the execution graph cannot be predicted in advance. It will change according to the data. But regardless of that, the optimum machine does the same thing as before, identifying atomic tasks which can be executed, assigning them to processors, and picking up the operands and results. In the literature, it is customary to speak of "tasks" or "processes" which consist of sequential executions of operations, these tasks or processes communicating with other tasks or processes. The execution graph can be interpreted to depict this concept by arranging the nodes on each row 410, 420, 430, 440, 450 so that the state operands 401, 411, 421, 431, 441, 451 are transmitted from some node directly above. This arrangement can always be achieved, and then we call each column A-E a compound task. The notion of compounded task models the communicating sequential tasks or processes discussed in the literature. Note that the interpretation in terms of compound tasks does not change the functions required of the optimum machine, which deals with atomic tasks at the instant of their execution.

We turn now to considering how much we can speed up computers by exploiting concurrency. The upper bounds have been discussed above and are shown in FIG. 2. The practical limits are defined by how closely the optimum machine can be approximated in a realizable computer system now that we know what it must do. In this regard, a function is defined as realizable if it can be implemented with conventional circuit elements such as gates, flip-flops and memory chips.

Reduced Conflict Memory

The optimum machine's functions of sending operands and storing results can be approximated through use of the techniques described in Sullivan et al U.S. Pat. Nos. 4,484,262 and 4,707,781, depicted in simplified form here in FIG. 5. A plurality of processors $S_1$-$S_8$ share a common memory 540. The memory 540 has a plurality of memory units $U_1$-$U_8$, enough to provide sufficient bandwidth for the machine to operate well. A multistage network 530 is provided to connect the processors $S_1$-$S_8$ and memory units $U_1$-$U_8$. It can transmit memory access requests to any of the memory units $U_1$-$U_8$ and includes switches at the nodes 511-514, 521-524, 531-534 so that the memory access request reaches the correct memory unit.

Figure 5:
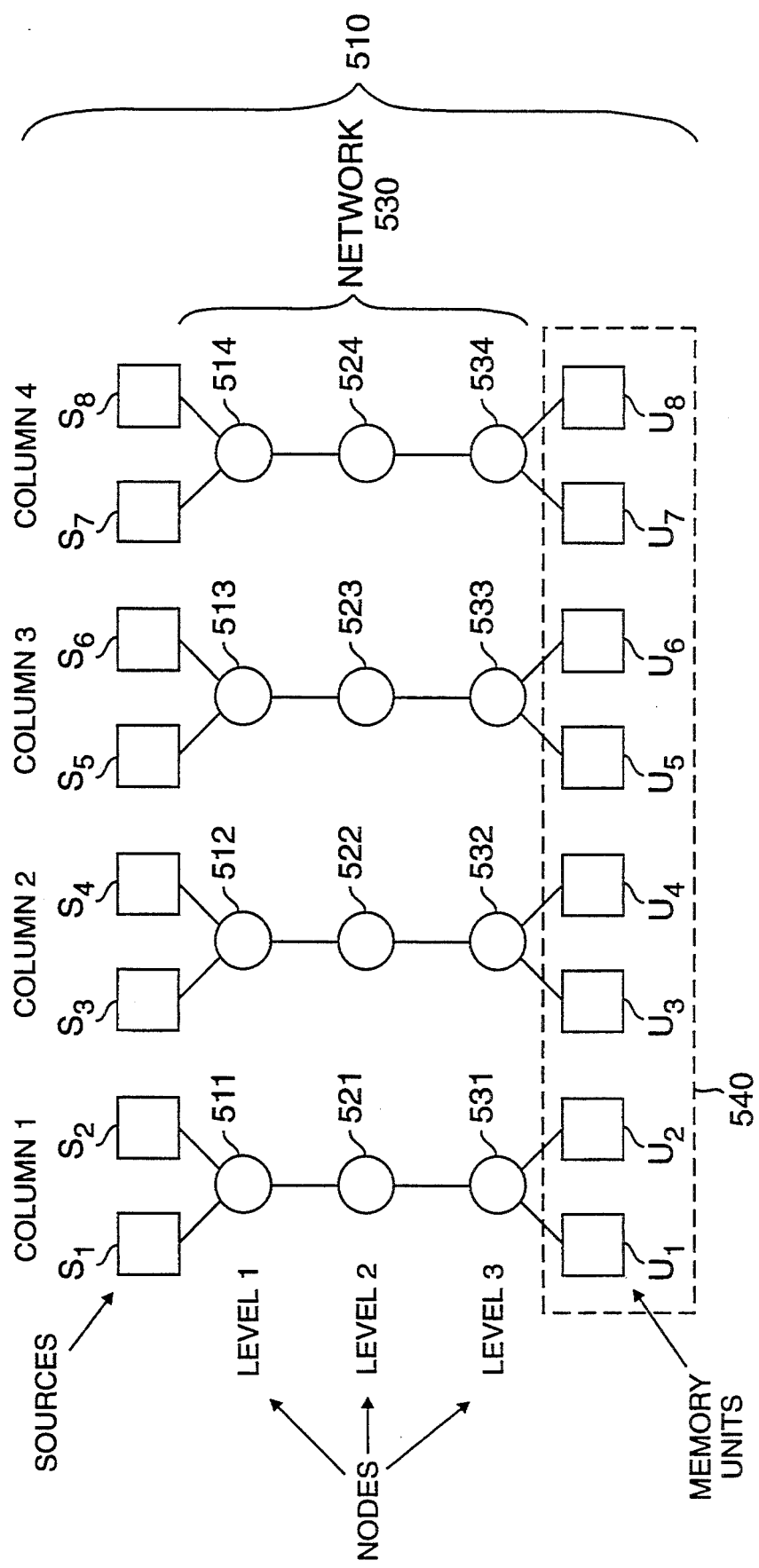
FIG. 5 is a schematic block diagram of a system in accordance with my invention utilizing a conflict free network to connect processors with memory.

In order to permit simultaneous writes and reads to any location, the system 510 of FIG. 5 has two features. First, the addresses of data in memory are randomized or pseudo-randomized. This can be done by hashing the address with a hash that is the same for all processors. The result is that the memory access requests are randomly distributed so that the likelihood of a build up of memory access requests at one memory unit is minimized. Second, the network 530 deals with the problem of requests from more than one processor to read the same location. A combining unit at each network node looks at each memory request, such as READ requests and synchronizing requests, to see if another one has been addressed to the same location. If such a request is pending, the second one is put in a temporary storage buffer (TSB) in the node. When a response is received at a node from the memory 540, the node checks its TSB for additional memory requests directed to the same memory address. If one is found, a copy is sent to the requesting processor. As a result, only one of several concurrent requests is received at the memory unit containing the information, but the response is sent to all requesting processors. All requests may be combined with concurrent requests for the same item in memory in this fashion, virtually eliminating conflicts. Such networks are referred to as conflict-free networks. In some systems sufficient improvement may be achieved if only some of the requests or some types of requests are combined. For example, all synchronizing requests can be combined using the technique described above and other mechanisms used to cope with plural read requests for the same item. Such networks are referred to as reduced conflict networks.

The combination of randomized memory locations and the network 530 with TSB operating as described is referred to as reduced conflict memory.

The difference between this system of sending operands and storing results from that of the optimum machine is called memory latency. That is the time T required for the requests and responses to pass through the multiple stages of the network 530 to and from the memory units 540.

Although hypothetically, for small problems, the latency T would slow the computer system, in high performance computer practice there is no significant adverse effect because we can compensate for the latency. If a processor requests an operand from memory and must wait idle until it is received, it is idle for T units of time. If all the processors of a computer operated in this fashion, the whole machine would be slowed by a factor of T. In accordance with my invention, however, the processor goes on to process other tasks which don't depend upon that memory access. As soon as a request is made on behalf of one atomic tasks, the processor switches to another. After T units of time, on average, the latency is overcome. In order to do this, however, you need to employ $T+1$ times as much concurrency, that is, have $T+1$ times as many atomic tasks. As a result, each processor of this example requires $T+1$ registers for state operands in order to provide optimum operation in overcoming latency.

Runnable Task Identification

The next function of the optimum machine to be approximated is that of identifying runnable atomic tasks. The traditional approaches of assignment of tasks by a central, synchronizing processor is not practical. In accordance with my invention, this function is accomplished in a decentralized fashion through the main memory.

A task is runnable when its operands have been evaluated. In order to determine whether or not operands have been evaluated, in one embodiment I add two data bits to the space 601 for representation of data in each memory location 600. One is the data available bit 602, the other is the task waiting bit 603. See FIG. 6. Typically, each of these bits is set initially to a false condition, e.g., a value such as zero, to represent no data available and no task waiting, respectively. When data is placed in a location, the data available bit is set by a memory manager in the memory unit to so indicate. When a processor makes a request on behalf of an atomic task, the request passes through the network, such as network 530 of FIG. 5, to the memory unit in which the memory location 600 is found. If the operand is available there, the data available bit so indicates, and the memory responds and sends the data back to the requesting processor. If the data is not available, the task waiting bit is set to true, and the task identification and requesting processor identification are stored in the memory location by the memory manager 720, schematically shown in FIG. 7 in a memory unit 700 together with an incoming queue 710 and a plurality of memory locations 730. (If the data waiting bit was not initially set to false, that is also done at this time).

When an operand is evaluated by a processor and sent to memory, the receiving memory manager 720 notes that task waiting bit 603 is set to true and fetches the identification information from the memory location's data space 601 before storing the operand there. Of course, if the network is a conflict free network as described above, only one request will be waiting in the memory location; however, others may have been intercepted and are waiting at nodes of the network. Responses to those requests are made by the network nodes in the manner previously described. When a processor receives an awaited operand from memory, the waiting task is placed in a queue of runnable tasks and is run when the processor is available. If the network is not conflict free, then there is a need to record more than one waiting task per memory location. This can be done by use of pointers to a separate list of waiting tasks in the memory unit or by having the memory manager directly check a task waiting list when an item is received for storage in a memory location. The latter techniques can, of course, also be used when a conflict-free network is used.

Alternative techniques to the use of dedicated bits for designation of valid data and waiting tasks can also be used. For example, one or more given symbols in the memory location can be reserved and not used for valid data. All task waiting identifiers can have a format which differs from that of valid data. The presence of such a symbol can be recognized by the memory manager as a task waiting indicia.

There is no additional cost to performance as a result of using this technique if the memory latency issue has already been addressed by providing increased concurrency, as previously described.

Task Assignment

Figure 10:
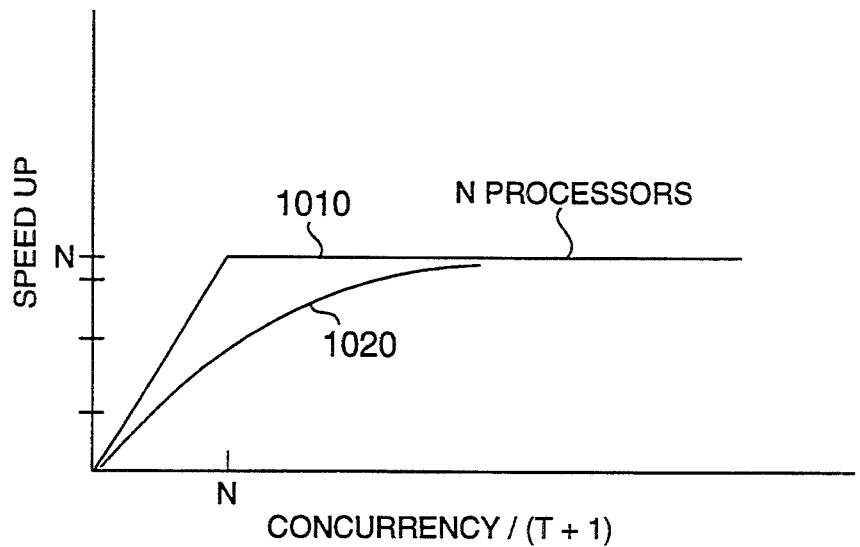
FIG. 10 is an illustrative graph of the dependence of speed up upon concurrency in accordance with my invention.

The remaining function of the optimum machine to be approximated is that of task assignment. The problem of task assignment is the possibility that one processor will have more than one runnable task in its queue while another may have none and, therefore, is idle. As a result, performance would be reduced. In the idealized situation, the optimum machine would instantly take one of the runnable tasks from the register files of one processor and put it into the register files of another so that the idle processor could be put to work during that cycle. Since we don't know how to implement that, I instead rely on a statistical approximation. Tasks are simply assigned to processors in a generally random fashion, for example, by hashing techniques. If the processor is idle at some time, we accept the loss in performance. Typically, a random distribution of 12 tasks among 4 processors might give a distribution 4,3,2,3 among the processors. Since the maximum units of time for completion will be 4 cycles to do 12 operations, the speed up will be 3 rather than the optimum speed up of 4. Looking more generally at this problem, which is the classic problem of balls and bins, we get a performance curve 1020 as shown in FIG. 10 along with the ideal performance curve 1010. Thus, with a modestly larger concurrency C than the number N of processors, the random assignment of tasks to processors will achieve close to the optimum task assignment performance.

FIG. 8 illustrates the basic structure of a processor 800 suitable for use in accordance with my invention. All of the major functional units 810 are illustrated with their data paths. The functional units 810 operate on the contents of registers to produce a result to be stored in a register or sent to memory or both. They also compute addresses in order to send a memory request on to the memory request unit 830. Both load and store type instructions result in a response from memory which is routed by the memory response unit 840. Instructions are fetched by the instruction issue means 870 from the instruction cache 850. If the cache 850 does not contain the requested instruction, a request is sent to the memory request unit 830 and instruction execution is temporarily suspended. When the request is filled, the instruction is routed by the memory response unit 840 to the instruction cache 850 and execution resumes.

The task manager 860 monitors the progress of the functional units. If an instruction fault (divide by zero, illegal opcode, etc.), hardware fault (memory parity), or synchronization fault (data unavailable) occurs, the task manager 860 causes the executing task to be suspended and starts up the highest priority task that is ready to run. In addition the task manager 860 supports preemptive scheduling. If a task with a higher priority than the running task becomes ready, the task manager 860 causes the executing task to be suspended and starts the higher priority task running.

Input and Output (I/O) devices 880 generate requests directly to the memory request unit 830. Input data from external devices flows through the memory request unit 830. Output data is routed through the memory response unit 840.

Figure 9:
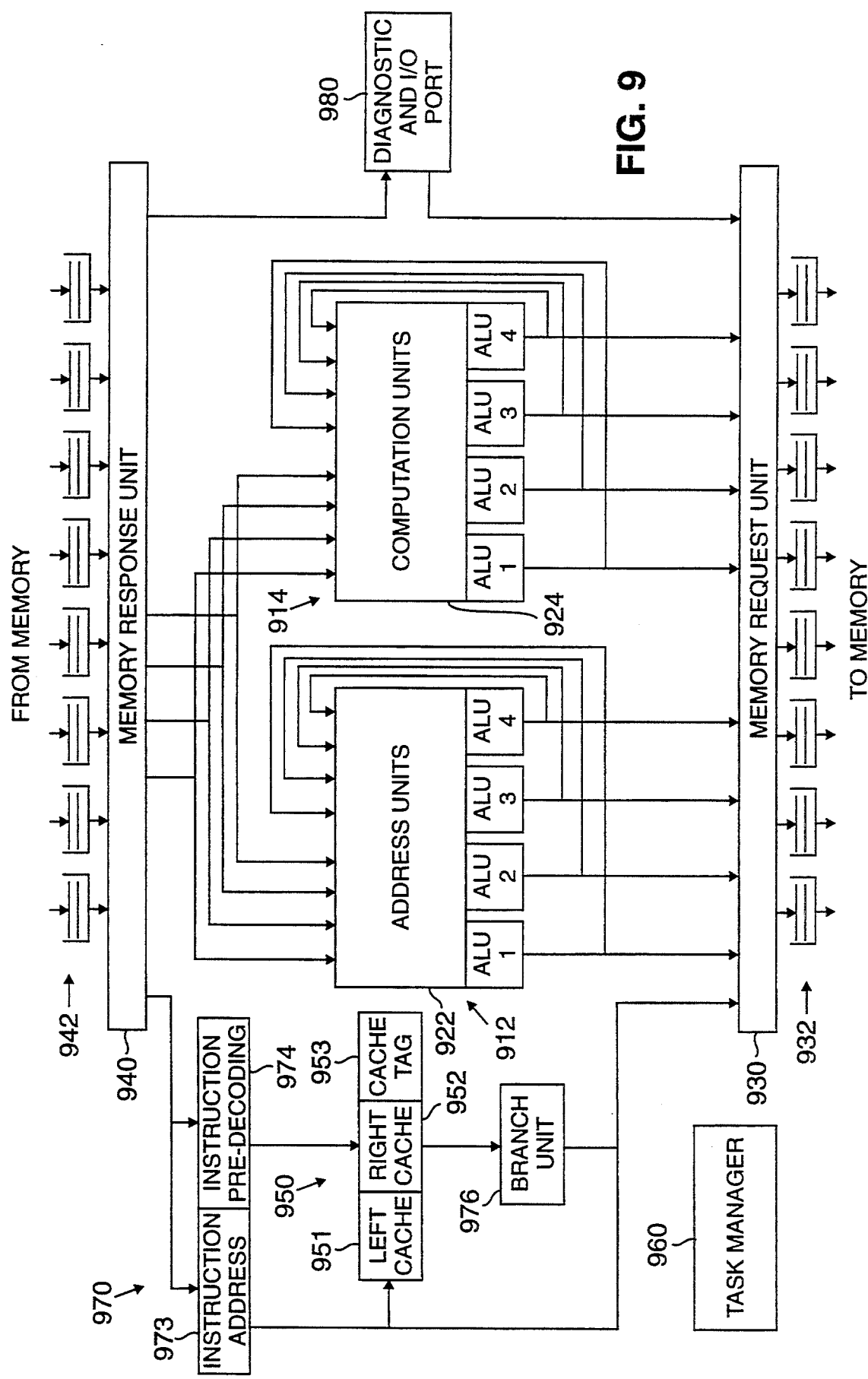
FIG. 9 is a more detailed schematic block diagram of a processor in accordance with one embodiment of my invention.

FIG. 9 shows a more detailed view of the interaction of the 9 functional units 912 and 914 with the registers. The figure is the view of the registers and functional units as seen by a single instruction thread. Instructions are fetched and executed according to the program counter that is normally incremented by one unless there is a branch taken. The registers are divided into two sets of 64 (64 bit) registers, each set is served by 4 functional units. The address register set is used in address calculation and the computation register set is used to hold computational results. Calculations performed in the functional units can cause the setting of the condition code registers that are then available for testing by the branch functional unit.

Messages from memory are received by the memory response unit 940 via input queues 942 and are provided to the address unit registers 922 and computation unit registers 924 for processing by their corresponding functional units 912, 914. Messages are transmitted to memory via the memory request unit 930 and output queues 932. Diagnostic messages and externally generated input and output messages bypass the processor via direct connection of a port 980 to the memory request unit 930 and memory response unit 940. An instruction issuing unit 970 comprises an instruction address 973 and instruction pre-decoding 974 sections. The instruction cache 950 comprises two caches 951 and 952, designated as left and right, and a cache tag unit 953. A branch unit 976, which make decisions regarding instructions involving branches, is also provided. The task manager 960 monitors the progress of tasks as described for task manager 860 of FIG. 8.

The memory is addressed by memory reference instructions using addresses computed in the address functional units. Each address is the unique storage location for a 64 bit datum. In addition to the data bits, there are two control bits used for synchronization operations. Since every memory location is available for synchronization operations, every memory location has these control bits. FIG. 6, previously discussed, shows the organization of a memory location.

The two control bits are used in the Send/Receive and Get/Put synchronization operations that are explained further in detail below. The empty/full bit indicates whether the synchronization datum has yet been stored in the location. The wait/nowait bit indicates whether a recipient task has arrived prior to the storing of the datum and is presently waiting.

Even though FIGS. 8 and 9 show the conflict free memory as separate from the memory request/response units at the computing nodes, logically they are all part of the memory system. The memory request/response units contain the first and last stage of routing and conflict resolution hardware that creates the conflict free property of the memory. The conflict free property means that regardless of the access pattern, memory requests do not interfere with each other to create a sequential bottleneck. All of the processors can access the same or any pattern of different locations, and they are all serviced equally without having to wait in line for access to a particular memory bank or particular memory location.

As was shown in a previous section, each processing node is capable of generating up to 4 address calculations and therefore up to 4 memory requests on each clock. They memory request unit, the conflict free memory, and the memory response unit have sufficient bandwidth to handle four requests and four responses from every node on every clock.

The conflict free property and the sufficient bandwidth make it possible for the programmer to largely ignore the properties of the memory even in writing complex, multitasked software. At all times the memory can be considered as a conventional uniprocessor memory with the certain latency. No special consideration need be made when multiple tasks are going to access memory in a particular pattern.

In order to permit the programmer to easily compensate for memory latency, the load and store instructions are accomplished asynchronously. That is, the node does not wait for the completion of the load or store in order to go on to the next instruction. The load instruction is routed to memory, filled and routed to the requesting register simultaneous with the node continuing to execute further instructions. If the node attempts to make use of a register which has not yet received its datum from the outstanding load, the node temporarily suspends the execution of instructions and waits for the completion of the load. The wait is accomplished by special hardware and need not be of concern to the programmer. To achieve the highest performance, however, the programmer should allow sufficient time between the load instruction and the use of the register to cover the memory latency. The store instruction also proceeds asynchronously but since data is being sent to memory no wait is necessary.

A load instruction uses one of the address functional units to compute the address. The computation can be either the adding of two registers or the adding of an immediate value to the contents of a register. The result is used as the effective address. The result can also be stored in a register. Using this feature, the address can be incremented or decremented in the same instruction parcel as is used for the memory reference.

When a store operation is performed, the datum to be stored is derived from the results of either an address unit or a computational unit. Any operation normally performed by a functional unit creating the datum can be used to create the value to be stored. As in any calculation the result may be sent to a register in addition to being sent to memory. Also the address calculation can be stored back in a register as in the load instruction. Note that since the store operation is sending a value to memory, it requires two functional units, one to compute the address and one to compute the value.

Whereas FIG. 8 showed each register file as just 64 registers, the actual register file, of this embodiment has storage for 64 of these sets of 64 registers. Each of these sets of 64 registers is associated with a single task. In one processor there can be 64 computational registers. Each of these 64 locations for register sets is referred to as a task slot or simply a slot. A task is assigned to one of these slots at creation. A task is then uniquely identified by the processor on which it lives and the task slot it occupies within the processor. Only one task in each processor is currently running at any one time and thus only its registers are accessible to the functional units for computation. The currently running task is known as the active task.

Figure 11:
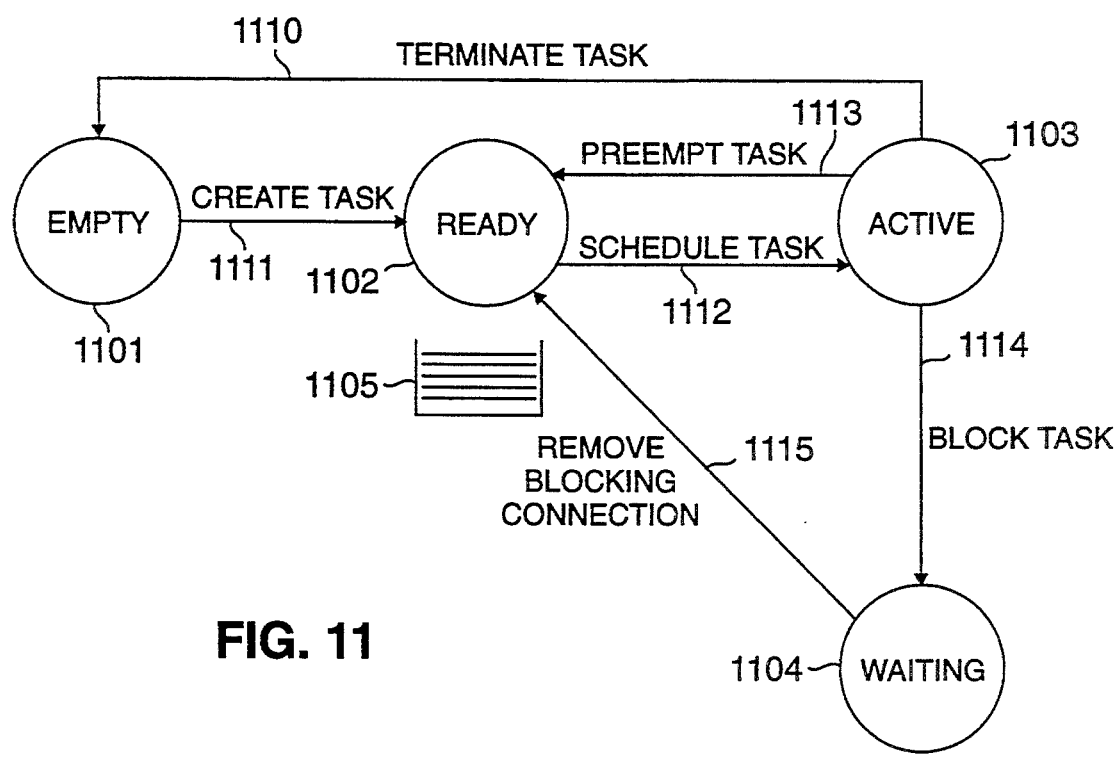
FIG. 11 is a state diagram illustrating possible state transitions for task slots of a processor in accordance with one embodiment of my invention.

The Task Manager 860 contains a local store where the remainder of the state information for a task is kept. There are 64 slots in the local store of a processor corresponding to the 64 possible tasks in a processor. Task slots can be in one of four states. FIG. 11 illustrates the possible state transitions:

Empty—1101 There is presently no task assigned to the slot.

Active—1103 The task in the slot is currently executing instructions.

Ready—1102 The task in the slot is ready to run. That is, all of the registers contain valid data for the next instruction to execute.

Waiting—1104 The task is not ready to run. That is, one or more of the registers needed by the current instruction have not yet received the data requested from memory by a synchronizing instruction.

The ready tasks are kept in task manager queues 1105 in the task manager 860 according to their priorities. The task manager uses a preemptive scheduling algorithm. If a task with priority higher than the currently active task becomes ready to run, the current task is preempted and the higher priority task is made active. There is no set order to the execution of tasks at equal priority. Any one of the ready tasks at the highest priority can be selected by the task manager to become the active task.

FIG. 11 is a state diagram illustrating possible state transitions for task slots of a processor in accordance with one embodiment of my invention. Four states are illustrated: EMPTY 1101, READY 1102, ACTIVE 1103 and WAITING 1104. The only task status instruction which can be executed when the task slot is in the EMPTY state 1101 is the CREATE TASK instruction 1111. This changes the status to READY 1102. The only task status instruction which can be executed when the task slot is in the READY state 1102 is the SCHEDULE TASK instruction 1112. It is based on the availability of tasks in the TASK MANAGER QUEUE 1105. It changes the status to ACTIVE 1103.

Three different task status instructions can be executed from the ACTIVE status 1103. A BLOCK TASK instruction 1114 is executed, for example, when necessary data is unavailable. It changes the status to WAITING 1102. When the reason for WAITING status 1102 is terminated, the REMOVE BLOCKING CONNECTION instruction 1115 returns the status to READY 1102. The second instruction which can be executed from ACTIVE status 1103 is the PREEMPT TASK instruction 1113 which returns the status to READY 1102. The third instruction which can be executed from ACTIVE status 1103 is the TERMINATE TASK instruction 1110 which returns the status to EMPTY 1101.

The exchange of the current active task for another of the tasks in a node is called a task swop. A task normally remains active 1103 until one of the four events that causes the swop of the active task occurs.

Task Termination 1110 The active task 1103 executes a task termination 1110 instruction or the task manager receives an external request to terminate the task.

Unavailable register The next instruction to be executed needs to use a register that has not yet received its requested synchronization datum. Note that a task swop does not occur when a register is unavailable due to the memory latency on an ordinary load from memory instruction. In that case, the node simply waits for the datum to become available and no swop occurs.

Task Preemption A task with a priority higher than the active task becomes ready. The active task is preemptively swopped for the higher priority task.

Program Interrupt The current instruction causes an interruption to occur. The interruption may be a trap instruction, supervisor call instruction, divide by zero, loss of precision, etc.

It is important to note that the entire control and management of the tasks is handled by the hardware task manager 860. The functional units and the program do not get involved except to directly or indirectly generate the event that triggers the task manager 860. Having these actions performed in hardware enables a very fast context switching between tasks and in many cases the task manager is able to perform its activities in parallel with ongoing computations.

Once an event occurs that initiates a task swop the following actions occur in parallel. The active program counter and task status words are placed back in their task slot in local store. The program counter and task status words for the new active task are made active. The active register sets are placed in their background slot and the register sets for the new task are brought from their slot into the active position. The first instruction to be executed comes through the pipeline to reach the functional units.

The shared conflict free memory is the only communication path between the nodes in this embodiment. Therefore, all transfer of information among tasks is accomplished through the memory. Three types of communication are possible. Shared memory can simply be read and written by multiple tasks. Tasks can be directly synchronized using special instructions that implement the synchronized transfer of data. Finally a number of memory reference instructions that alter memory in an indivisible way are available to efficiently implement some common uses of shared memory.

Task synchronization is accomplished by two sets of instructions for the synchronous transfer of a datum between tasks. The Get/Put pair of instructions are used for the transfer of a 64 bit word between two tasks. The Send/Receive pair of instructions are used to have one task distribute copies of a 64 bit word to multiple tasks. These are synchronous transfers in that a task attempting to use a synchronous datum is held in the Wait state until the datum is created and Sent by the task.

Figure 12A:
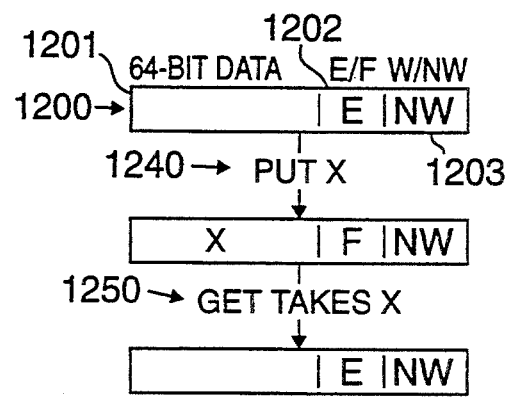
FIGS. 12A and 12B illustrate Get and Put instructions for transfer of a data word between tasks in accordance with one embodiment of my invention.
Figure 12B:
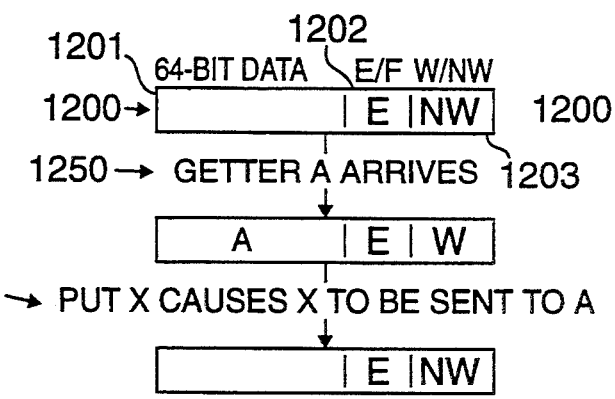

The synchronous exchange between single tasks using the Get/Put instructions has the memory locations state proceed as shown in FIG. 12A and 12B. The memory location 1200 has two control bits, empty/full 1202 and wait/nowait 1203, as was described earlier. There are two cases shown, the Putter 1240 arrives before the Getter 1250, and the Getter 1250 arrives before the Putter 1240.

If the Putter 1240 arrives first, FIG. 12A, the datum is deposited in the location 1201 and the empty/full bit 1202 is set to full. The wait/nowait bit 1203 remains at nowait since there are not any waiting tasks. When the Getter 1250 arrives, it finds the location 1202 set to full and takes the datum resetting the bit 1202 to empty.

If the Getter 1250 arrives first, FIG. 12B, it discovers that the location 1202 is set to empty. It then deposits identification information in the location 1201 (node, task slot, receiving register) and sets the wait/nowait bit 1203 to wait to indicate that a task is waiting for the datum. When the Putter 1240 arrives, it finds the location 1203 set to wait. It takes the datum and sends it to the register in the task slot specified by the identification information found in the location 1201. It resets the locations 1202 and 1203 to empty and nowait respectively. Note that a Get/Put pair is the passing of a datum between tasks, the datum need not ever be in memory.

Figure 13A:
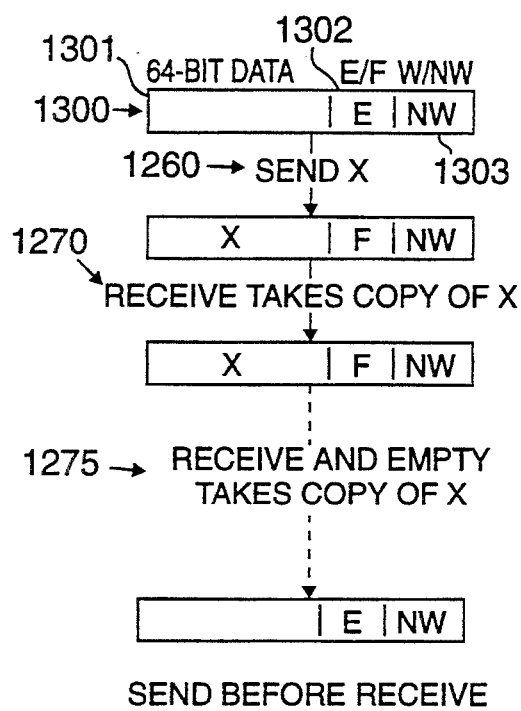
FIGS. 13A and 13B illustrate Send and Receive instructions for distribution by one task of copies of a data word to multiple tasks in accordance with one embodiment of my invention.
Figure 13B:
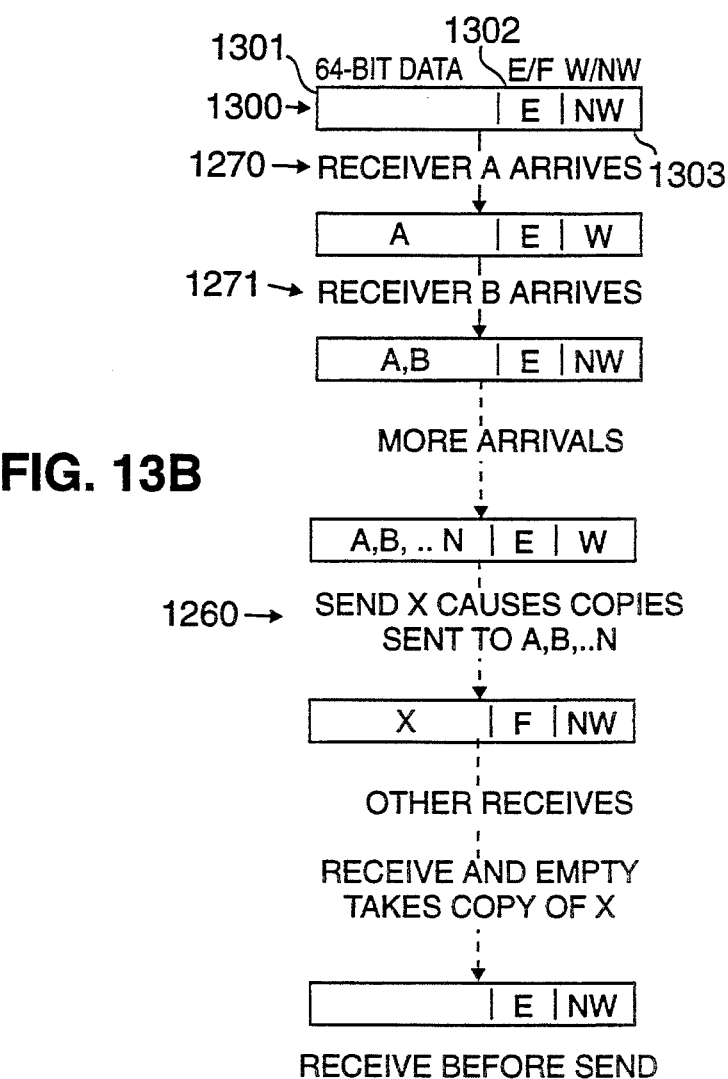

The Send/Receive instruction pair permit the synchronous transmission of a single 64 bit word from one task to many tasks. The transmission is fundamentally different from that achieved by the Get/Put pair. In Send/Receive copies of the datum are delivered to each Receiver, whereas with Get/Put a single 64 bit object is transferred and no copies are made. FIGS. 13A and 13B show the changes in the memory location state as the Send/Receive instructions proceed. Two cases are shown, Sender 1260 arriving before any Receivers 1270, and several Receivers 1270 arriving before the Sender 1260.

If the Sender 1260 arrives first, FIG. 13A, the datum is deposited in the location 1301 and the empty/full bit 1302 is set to full. As each Receiver 1270 arrives, it takes a copy of the datum back to the requesting register. Since the Receiver 1270 in this case normally takes no action with regards to the control bits, additional instructions are needed to permit the resetting of these bits. Instructions are provided to permit the empty/full bit 1302 to be cleared either in combination with a Receiver 1270 or as a separate instruction.

If one or more Receivers 1270, 1271 arrive first, FIG. 13B, they are kept waiting for the datum. For illustrational purposes, the multiple waiting Receivers are shown as being stuffed into the single 64 bit location. In reality, a special hardware mechanism effectively permits the queuing up of waiters. The wait/nowait bit 1303 is set to wait on the arrival of the first Receiver 1270. When the Sender 1260 arrives with the datum, the empty/full bit 1302 is set to full and a copy of the datum is sent to each of the receivers. The datum is then stored in the location 1301 for any following Receivers 1275. These later Receivers simply take a copy of the datum. Since the list of waiting Receivers 1270, 1271 can be quite long, special hardware mechanisms are provided to permit the distribution of the datum to the Receivers without sequentially transmitting it to each Receiver on the list. In fact the datum is transmitted to all of the Receivers in a time similar to that which would be taken for all of the Receivers to Load a datum from one location in the conflict free memory.

At the node, the synchronization instructions receive somewhat special treatment. The Send and the Put instruction look very much like a store to memory instruction. A request is sent to the Memory Request Unit and passed along to memory. Likewise the Get and the Receive instructions look very much like the Load from memory instruction. As far as the task is concerned it is loading a 64 bit value into a register. The difference from the tasks point of view is that with this synchronizing load the determination of the latency is more complex. Since the receipt of the datum is dependent on when the creating task Puts or Sends it, the latency can only be determined by a detailed analysis of the program. Even then it is not certain because the scheduling of tasks by the task manager 860 influences the timing. If the task attempts to use the register to which it has done a Get or Receive and the datum has not yet arrived, the task manager changes the status of that task slot to waiting and swops in another ready task. When the datum finally arrives, the task manager changes the status to Ready. If the task has a higher priority than the active task, it is immediately swopped into the active position. Otherwise it remains Ready and the task manager can swop it in according to its priority.

Thus, it can be seen that machines can be made in accordance with my invention which optimize the use of concurrency to high degree without restriction to a specific class of algorithms.

It should be understood that the embodiments and variations shown and described herein are illustrative of my invention, that they are not intended to limit the scope of my invention, and that various modifications may be implemented by those skilled in the art without departing from the scope of the invention.

I claim:

1. A computer system for processing a plurality of tasks with respect to a plurality of data items, at least some of said tasks being sequentially related, said system comprising:

a main memory comprising a plurality of separately accessible memory units for the storage of said items;

a plurality of independent processors generating requests for said items stored in said memory units, each of said independent processors further comprising:

means for processing runnable tasks which are assigned to a processor while other tasks assigned to said processor are waiting for items, said means for processing runable tasks further comprising means for executing a task swop, means for identifying tasks which have become runnable as a result of said data items becoming available, wherein at least one of said independent processors has a plurality of tasks assigned to it;

a communications network permitting processors to communicate with and request items from said memory units; and wherein identifications of said tasks waiting for said items are stored in said memory units to be used for storage of said items.

2. The computer system of claim 1 wherein the items have been assigned to memory units selected in a generally random fashion.

3. The computer system of claim 1 wherein the communications system comprises a reduced conflict communication network.

4. The computer system of claim 3 wherein the items have been assigned to memory units selected in a generally random fashion.

5. The computer system of claim 1 further comprising a memory manager in the main memory connected with each of the memory units, each of said memory managers comprising means for determining whether or not the memory unit contains a requested item, for storing a request when the memory unit does not contain the requested item, and for transmitting an item to a requesting task and identifying the task as runnable when the item is received by the memory unit.

6. The computer system of claim 1 wherein each memory unit comprises a plurality of memory locations for storage of items and indicia can be stored in said memory locations to indicate whether or not a task is waiting for an item from that location.

7. The computer system of claim 6 wherein indicia which can be stored in said memory locations further comprises identification of a task waiting for an item from that location is stored in that location.

8. The computer system of claim 7 wherein the indicia of a task waiting is a single bit stored in a dedicated part of each memory location.

9. The computer system of claim 7 wherein the indicia of a task waiting is contained in the format of the task identification stored in the memory location.

10. The computer system of claim 7 wherein one bit of each memory location is dedicated to indicating whether or not that location contains data.

11. The computer system of claim 6 wherein the items have been assigned to memory units selected in a generally random fashion.

12. The computer system of claim 6 wherein the communications system comprises a reduced conflict communication network.

13. The computer system of claim 1 wherein said tasks are initially unassigned to processors.

14. A computer system for processing a plurality of initially unassigned tasks in parallel, at least some of said tasks being sequentially related, said system comprising:
a main memory comprising a plurality of separately accessible memory units, each of said memory units comprising a plurality of memory locations for the storage of separate items;
a plurality of independent processors operating concurrently, each of said processors comprising:
arithmetic and logic units,
means for storing a set of tasks, said tasks being assigned to said processors in a generally random fashion,
means for processing runnable tasks which are assigned to a processor while other tasks assigned to said processor are waiting for items, said means for processing runable tasks further comprising means for executing a task swop,
wherein at least one of said independent processors has a plurality of tasks assigned to it;
a reduced conflict communication network permitting each of said processors to communicate with and request items from each of said memory units; and
each of said memory units further comprising a memory manager for determining whether or not a memory location contains a requested item for causing the identifications of requesting tasks to be stored in the memory unit when that location does not contain a requested item, for transmitting requested information to requesting processors, and for identifying tasks which have become runnable as a result of said items becoming available.

15. The computer system of claim 14 wherein an indicia of a waiting request for an item is stored at the memory location where the item is to be stored pending receipt by the memory unit of the item.

16. The computer system of claim 14 wherein the memory manager further causes requesting processor identification to be stored in the memory unit when a memory location does not contain a requested item.

17. A method for operation of a computer system for the parallel processing of a plurality of initially unassigned tasks, at least some of said tasks being sequentially related, and computer system comprising a plurality of processors for processing tasks, a plurality of memory units each comprising a plurality of memory locations, and a communications network permitting each of said processors to communicate with each of said memory units, said method comprising the steps of:
a processor generating a memory request when an item is required from memory for a task;
transmitting said memory request to the proper memory unit via said communications network;
determining whether or not said memory unit contains the requested item;
if said memory unit contains said requested item, transmitting said requested item to said requesting processor;
if said memory unit does not contain said requested item, storing identification of the requesting task in said memory unit until such time as said requested item is received by said memory unit;
identifying as runnable said requesting tasks which have become runnable as a result of said requested item being received by said memory unit;
determining whether items contained in WRITE requests received by said memory unit are the subject of awaiting memory requests and, if so, transmitting the requested item to the requesting processor;
if said memory unit does not contain said requested item, suspending processing of the requesting task and initiating processing of a runnable task; and
wherein said step of identifying as runnable said requesting tasks which have become runnable as a result of a requested item being received by said memory unit is performed by the processor which generated the memory request for said item.

18. The method for operation of a computer system of claim 17 wherein the memory requests comprise synchronizing requests.

19. The method for operation of a computer system of claim 17 wherein the memory requests comprise READ requests.

20. The method of claim 17 further comprising the steps of assigning data to the memory units selected in a generally random fashion.

21. The method of claim 20 further comprising the step of assigning tasks to processors selected in a generally random fashion.

22. The method of claim 17 further comprising the step of assigning tasks to processors selected in a generally random fashion.

23. The method for operation of a computer system of claim 17, said method further comprising the step of, if the memory unit does not contain the requested item, storing identification of the requesting processor in that memory unit until such time as the requested item is received by the memory unit.

24. A method for operation of a computer system for the parallel processing of a plurality of initially unassigned tasks, at least some of said tasks being sequentially related, and computer system comprising a plurality of processors for processing tasks, a plurality of memory units each comprising a plurality of memory locations, and a communications network permitting each of said processors to communicate with each of said memory units, said method comprising the steps of:
- a processor generating a memory request when an item is required from memory for a task;
- transmitting said memory request to the proper memory location via said communications network;
- determining whether or not said memory location contains the requested item;
- if said memory location contains said requested item, transmitting said requested item to said requesting processor;
- if said memory location does not contain said requested item, storing identification of the requesting task in said memory location until such time as said requested item is received by said memory location;
- identifying as runnable said requesting tasks which have become runnable as a result of said requested item being received by said memory location;
- determining whether items contained in WRITE requests received by said memory location are the subject of awaiting memory requests and, if so, transmitting the requested item to the requesting processor;
- if said memory location does not contain said requested item, suspending processing of said requesting task and initiating processing of a runnable task; and
- wherein said step of identifying as runnable said requesting tasks which have become runnable as a result of a requested item being received by said memory location is performed by the processor which generated the memory request for said item.

25. The method for operation of a computer system of claim 24, said method further comprising the step of, if the memory location does not contain the requested item, storing identification of the requesting processor in that memory location until such time as the requested item is received by the memory location.

26. A method for operation of a computer system for the parallel processing of a plurality of tasks, at least some of said tasks being sequentially related, and said computer system comprising a main memory having a plurality of separately accessible memory units, a plurality of independent processors, and a communications network permitting said processors to communicate with said memory comprising the steps of:
- storing data in said memory units;
- storing in said memory units information identifying tasks waiting for said data items when the requested data items are not available in said memory units;
- identifying as runnable said tasks which have become runnable as a result of said data items being received in said memory units;
- suspending the processing of tasks waiting for said data items and initiating processing of runnable tasks on the same processors which were processing the suspended tasks;
- wherein said step of identifying as runnable tasks which have become runnable as a result of said data items being received is performed by one of said plurality of independent processors.

27. The method of claim 26 further comprising the step of assigning tasks to the processors in a generally random fashion.

28. The method of claim 27 further comprising the step of assigning data to the memory units selected in a generally random fashion.

29. The method of claim 26 further comprising the step of assigning data to the memory units selected in a generally random fashion.

30. The method of claim 26 wherein said tasks are initially unassigned to processors.

31. A method for operation of a computer system for the parallel processing of a plurality of initially unassigned tasks, at least some of said tasks being sequentially related, and computer system comprising a plurality of processors for processing tasks, a plurality of memory units each comprising a plurality of memory locations, and a communications network permitting each of the processors to communicate with each of the memory units, said method comprising the steps of:
- a processor generating a memory request when an item is required from memory for a task;
- transmitting said memory request to the proper memory location via said communications network;
- determining whether or not said memory location contains the requested item;
- if said memory location contains said requested item, transmitting said requested item to said requesting processor;
- if said memory location does not contain said requested item, storing identification of the requesting task in said memory location until such time as said requested item is received by said memory location;
- identifying as runnable said requesting tasks which have become runnable as a result of said requested item being received by said memory location;
- determining whether items contained in WRITE requests received by said memory location are the subject of awaiting memory requests and, if so, transmitting the requested item to the requesting processor; and
- eliminating conflicts in memory requests in said communication network by determining at various nodes within said network when a new memory request is received whether a previous memory request addressed to the same memory location is pending, storing the new memory request at the node if there is such a pending memory request, and responding from the node to the new memory request when the response to the pending memory request is received at that node.

32. The method of claim 31 further comprising the steps of assigning data to the memory units selected in a generally random fashion.

33. The method of claim 31 further comprising the step of assigning tasks to processors selected in a generally random fashion.

34. The method of claim 32 further comprising the step of assigning tasks to processors selected in a generally random fashion.

* * * * *